Figure 1:
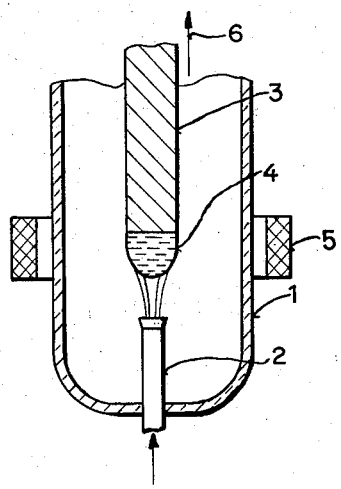

Dec. 13, 1960   T. RUMMEL ET AL   2,964,396
PRODUCING SEMICONDUCTOR SUBSTANCES OF HIGHEST PURITY
Filed May 23, 1955

United States Patent Office 2,964,396
Patented Dec. 13, 1960

2,964,396

PRODUCING SEMICONDUCTOR SUBSTANCES OF HIGHEST PURITY

Theodor Rummel, Munich, Heinrich Kniepkamp, Karlsruhe, and Reiner Emeis, Pretzfeld, Germany, assignors to Siemens & Halske Aktiengesellschaft, Munich and Berlin, Germany, a corporation of Germany Filed May 23, 1955, Ser. No. 510,493

Claims priority, application Germany May 24, 1954

1 Claim. (Cl. 75—10)

This invention is concerned with producing crystalline substances of highest purity, especially semiconductor substances.

A number of methods have been developed in the semiconductor technique for producing substances of highest purity, primarily semiconductor substances which are adapted for use in directional conductors, transistors, photo-transistors, fieldistors, electrically and/or magnetically affected resistors, varistors, thermistors and the like. Generally speaking, the substances to be obtained, for example, germanium, silicon or combinations of the elements of the 3rd and 5th or 2nd and 6th or, also, of the 1st and 7th groups of the periodic system, or multiple combinations lying therebetween or components of these substances, to be used as donors, acceptors, adhesion points, recombination centers and the like, and suitable elements or combinations, were heretofore produced in three steps, namely, initially chemically and subsequently purified in a melting process, preferably the so-called zone melting process, and finally processed by drawing from the melt to produce crystalline and preferably mono crystalline bodies.

The invention is concerned with an improvement according to which the three above-indicated steps comprising the chemical step and melt purification and the production of the crystal by drawing from the melt, are combined into a unitary procedure or operation.

The invention proceeds from a known fact, namely, the fact that certain substances, including semiconductor substances such as silicon, may be obtained from suitable gaseous components, by thermal decomposition in the gaseous phase. The element thereby produced, for example, silicon, was precipitated upon a suitable carrier on which it collected in powder form or in the form of smallest crystallites, and from which it was removed again for further processing, for example, by melting.

It has also been proposed to use such a procedure, for example, based upon silicon hexachloride or silicon-chloroform as an initial material, for the production of purest silicon for semiconductor purposes.

It has further been proposed to use for the intended purposes particularly pure initial combinations, for example, silicon halides, especially silicon chlorides.

The invention proposes to produce extremely pure, semiconductor substances, by precipitation in purest form, of the substance to be produced, from a gaseous compound of the corresponding semiconductor. The method comprises melting by the application of heat a portion of a highly pure carrier body, disposed within a reaction vessel and consisting of the semiconductor substance which is to be produced, and conducting a very pure gaseous compound of the corresponding semiconductor into said vessel for flow thereof to said molten portion to liberate from said compound by the heat of said molten portion semiconductor substance, thereby causing such liberated substance to precipitate upon said molten portion and thus effecting continuous growth of said carrier body. A compact crystalline body of the desired substance which may generally even be of coarse granular structure, may thus be produced directly. The molten phase is supported by the solid portion of the carrier body of identical material, which is preferably in crystalline and especially mono crystalline form. The solid part may serve as a support for the molten or liquid part; however, in the case of wetting melts, the molten portion may hang from a crystal rod in the manner of a drop. In order to prevent the release of the drop, means may be provided for counteracting gravity. This may, for example, be done pneumatically, for example, by a protective gas stream, especially an inert protective gas stream which is blown against the drop from underneath, or there may be provided an electromagnetic field upon which the drop rests in equilibrium. The solid rod which grows steadily in length due to the material precipitated thereon may be continuously drawn from the reaction chamber, upwardly (in the first case) or downwardly (in the second case). A particularly effective support of the molten material is effected by using two rods between which the molten portion of zone is supported. The two rods may extend coaxially vertically. However, under some circumstances, they may be disposed inclined or horizontal. Rotation of the rod or rods serving as carrier for the molten zone improves the symmetry of the melt and the quality of its crystallographic properties.

The reaction may be effected separate from the point at which is disposed the melt serving for receiving the precipitated material, and such material may be transported to the melt by a temperature gradient and/or a gaseous stream, preferably a stream of an inert gas. Electrical means may take the place of or may cooperate with these operations, for example, means for producing a so-called electrical blast for directing the produced substance to the melt. The reaction chamber in which the thermal decomposition takes place, may in such case be heated by suitable means, while the melt is held at a desired temperature by other means, for example, the melt temperature of the semiconductor that is being treated or produced. It may in some circumstances be suitable to hold the melting zone at least upon the surface thereof at another temperature, especially at a lower temperature.

In accordance with a particular embodiment of the invention, the reaction of the thermal decomposition is effected directly upon the surface of the molten phase of the body to be produced. The gaseous phase extends thereby directly to the molten phase. The melt itself, partially and additionally, serves as a heat source for carrying out the thermal decomposition. The melting is in case of a semiconductor suitably effected by high-frequency induction heating. The heating may however be effected by radiation or other means, for example, by atomic recombination energy or the like, or by electron or ion bombardment. It may be necessary in some circumstances, in the case of high-frequency induction heating, to preheat the semiconducting body first by other means, for example, by one of the means mentioned before, until such body has the necessary conductivity which permits high-frequency heating.

As a reaction gas which is, for example, suitable in the production of silicon, there may be used $SiCl_4$ and also the higher silicon halides or silicon chlorides such as silicon hexachloride or silicon octochloride; incompletely halinated silicon hydrogen, for example, silicon-chloroform and correspondingly higher homologues have been found particularly suitable. If desired, a reducing medium, preferably hydrogen, may be added. The gaseous substances which are to react are produced outside of the reaction vessel and conducted into the reaction vessel, if desired together with the reaction agent.

The silicon halide-producing means may be connected with the reaction vessel by one or more suitable conduits.

The pressure of the reaction gases is to be determined from case to case according to the dimensions of the reaction apparatus. Quicker reaction may be caused by increasing the pressure. It may, however, be suitable to avoid speeding up the reaction excessively, so as to obtain slow precipitation and undisturbed uniform crystals, preferably mono crystals.

It will be possible, by the application of mechanical vibrations at the phase border between the gas space and the melt to provide for a steady and uniform feed of the silicon which separates in the reaction and to cause thereby an acceleration of the process.

The electric blast for conducting the separated substance to the surface of the melt is preferably produced by means of points or knife edges disposed opposite the grounded melt body and charged with high voltage.

Figure 2:
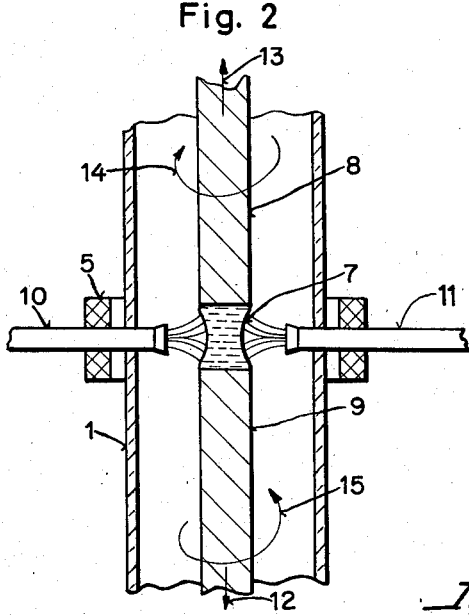

Examples of the invention will now be explained with reference to the accompanying diagrammatic drawing in which:

Fig. 1 represents the lower part of a reaction vessel for practicing one form of the invention; and Fig. 2 shows another embodiment of the invention.

In Fig. 1, there is provided a quartz tube 1, forming a reaction vessel, a small tube 2 being fused into the tube 1 at the bottom thereof, for introducing the reaction gases, for example, silicon chloroform and hydrogen. Numeral 3 indicates a highly purified silicon rod the lower end 4 of which is melted. The heating of the end 4 is carried out by means of an induction coil 5, after first preheating it by radiation. At the molten silicon drop 4 will occur a thermal decomposition or reduction of the silicon chloroform, yielding elementary purest silicon.

Conditions are similar when using $SiCl_4$ and H as reaction media. The reaction begins at about 900° C., so that silicon is initially separated in solid phase. It is, however, instantly taken up by the molten silicon mass 4 and thus results in a steady growth of the silicon drop suspended from the rod 3. The rod is coincidentally steadily drawn in the direction of the arrow 6, at such a speed that the upper portion of the molten mass 4 cools off upon leaving the induction field produced by the coil 5, such portion solidifying; the rod speed and the reaction speed being correlated so that the molten mass 4 grows as new material is formed thereon by the separation of silicon from the silicon chloroform.

The arrangement according to Fig. 1 may be changed in diverse manner. For example, special cooling means may be provided for causing the upper zone of the molten mass 4 to solidify quicker. The gas inlet 2 may be disposed at another point. Several inlets may be provided for different components partaking in the reaction. The entire arrangement may be turned by 180°, such, that the liquid mass will appear at the upper end of the silicon rod which is, in such case, steadily drawn downward.

In Fig. 2, a molten zone 7 is produced between the ends of two solid rods 8 and 9, which are made of purest silicon. There are provided two gas inlets 10 and 11, which are disposed in the side wall of the quartz tube 1. Suitable means (not shown) are provided for drawing the rods apart in the directions of the arrows 12 and 13. The two rods are at the same time uniformly rotated in the directions indicated by the arrows 14 and 15, by suitable not illustrated means. Instead of drawing the rods apart, they may be moved axially by increments, or such movement may be provided in addition to the steady displacement. A relatively thin rod may in this manner be enlarged as desired.

This last-noted arrangement may likewise be modified in several ways. For example, it may suffice to withdraw only one or the other rod. Similarly, only one of the rods may be rotated, or both may be rotated in the same direction of rotation but at different speeds. Auxiliary means may be provided for subjecting the molten zone 7 as such to a rotation, suitably by electrical means, for example, an electric rotation field provided therefor. By subjecting the two coils by suitable means to vibration, one relative to the other, or by other suitable means, there may be caused a good stirring of the material of the individual portions of the molten zone 7, resulting in uniform crystal growth at the solid rod and at the two ends of the two rods, respectively.

In accordance with another feature of the invention, the molten zone may be doped with donors, acceptors, adhesion points or recombination centers or other impurity substances, if desired at predetermined times, for example, intermittently. This may be done in a manner otherwise customary or proposed in the production of p-n junctions upon drawing mono crystals from melt, by addition of suitable solid, liquid or gaseous doping media. In the embodiment described, it is particularly recommended to work with an addition of doping matter in the gaseous phase. The doping matter may either be added to the reaction mixture or the individual components thereof, or there may be provided special feed conduits for conducting the various doping means into the reaction chamber.

It is in accordance with the invention possible to produce alloyed semiconductors, for example, combinations of the elements of the 3rd and 5th or 2nd and 6th groups of the periodic system. The individual components may thereby be brought into the reaction chamber, for example, in gaseous phase and may be melted together in a melting zone. The individual components may however even in this case be produced by thermal decomposition and brought into the molten zone in common for crystal growth upon a solid body, rod or the like.

In a further embodiment, the solid parts upon which vapors are precipitated or which carry the fluid phase of the substance to be separated, need not be made initially of such substance, but may be holder or carrier elements made, for example, of pure carbon, graphite, quartz, tungsten or the like. Upon such a body may be formed a molten drop of the substance to be separated, if desired by the use of an incompletely molten seed crystal which determines from the start a desired crystallization direction.

The use of carrier elements as noted above may introduce impurities into the molten zone bordering thereon, and the first portion of the produced substance therefore will not exhibit a sufficient degree of purity. The degree of purity will however increase with increased distance from the starting portion of the crystallization and such starting portion may be removed from the remainder of the produced body.

A semiconductor body completed in accordance with the invention may if desired be subjected to a known zone melting treatment producing one or several times a molten zone therein so as to obtain additional purification and/or a coarsening of the crystal structure thereof. In this manner may be systematically produced a mono crystal even without the use of a seed crystal.

If desired, auxiliary known means may be provided which prevent the appearance of reactions of the reaction gases or vapors with the walls of the reaction vessel, or which remove residues of impurity traces from the separated molten drop. For this purpose may be used additions of water vapor or carbon or carbon oxide or carbon dioxide, at predetermined relatively low vapor pressure. It may accordingly be suitable to conduct through the reaction chamber, during the reaction, a mild flow of a weakly oxidizing gas or gas mixture or a vapor mixture.

The vessel walls may be cooled in suitable manner, for example, by water or pneumatically.

An electric current may under some circumstances be caused to flow through holder or carrier rods and the liquid crystallization zone, especially in the arrangement according to Fig. 2, prior to and/or during the processing operation. It is thereby possible, with suitable polarization, to affect the crystal growth and/or the distribution of doping matter in the crystal. If desired, a preheating of the substance to be produced may thereby be effected, the induction field merely causing additional heating of the material.

Known and suitable means may in addition to those explained be used throughout for accomplishing the intents and purposes of the invention as described herein and as defined in the appended claims. Details of such means have not been shown in the drawings to keep them simple.

Changes may be made within the scope and spirit of the appended claim which defines what is believed to be new and desired to have protected by Letters Patent.

We claim:

In the art of producing in a suitable reaction vessel rod-shaped semiconductor substances of highest purity by melting a portion of a rod consisting of the substance to be produced and conducting to the corresponding molten zone a gaseous phase for reaction in said vessel to precipitate additional identical substance thereon, the improvement which consists in the provision of an electrical rotation field for said zone and vibrating the corresponding field coils for the purpose of agitating said zone to accelerate precipitation of substance from said gaseous phase.

References Cited in the file of this patent

UNITED STATES PATENTS

| | | |
|---|---|---|
| 2,674,528 | Beller et al. | Apr. 6, 1954 |
| 2,692,839 | Christensen et al. | Oct. 26, 1954 |
| 2,792,317 | Davis | May 14, 1957 |

FOREIGN PATENTS

| | | |
|---|---|---|
| 525,102 | Belgium | Jan. 15, 1954 |
| 1,065,523 | France | Jan. 13, 1954 |

OTHER REFERENCES

Keck et al.: Review of Scientific Instruments, vol. 25, No. 3, March 1954, pages 298, 299.

Keck et al.: Review of Scientific Instruments, vol. 25, No. 4, April 1954, pages 331–333.